United States Patent
Blanc

(10) Patent No.: US 10,051,991 B2
(45) Date of Patent: Aug. 21, 2018

(54) BOILER FOR A MACHINE FOR PREPARING BEVERAGES

(71) Applicant: COMPAGNIE MEDITERRANEENNE DES CAFES, Carros (FR)

(72) Inventor: Jean-Pierre Blanc, Nice (FR)

(73) Assignee: COMPAGNIE MEDITERRANEENNE DES CAFES, Carros (FR)

( * ) Notice: Subject to any disclaimer, the term of this patent is extended or adjusted under 35 U.S.C. 154(b) by 353 days.

(21) Appl. No.: 14/651,463

(22) PCT Filed: Dec. 11, 2013

(86) PCT No.: PCT/EP2013/076237
§ 371 (c)(1),
(2) Date: Jun. 11, 2015

(87) PCT Pub. No.: WO2014/090880
PCT Pub. Date: Jun. 19, 2014

(65) Prior Publication Data
US 2015/0327720 A1  Nov. 19, 2015

(30) Foreign Application Priority Data
Dec. 12, 2012 (FR) .................... 12 61968

(51) Int. Cl.
*H05B 3/78* (2006.01)
*F24H 1/10* (2006.01)
(Continued)

(52) U.S. Cl.
CPC ............. *A47J 31/542* (2013.01); *B23P 15/00* (2013.01); *Y10T 29/49389* (2015.01)

(58) Field of Classification Search
None
See application file for complete search history.

(56) References Cited

U.S. PATENT DOCUMENTS 1,519,395 A * 12/1924 Clench ................... F24H 1/102
   392/480
1,671,677 A *  5/1928 Keeton ................... F24H 1/142
   392/489
(Continued)

FOREIGN PATENT DOCUMENTS

DE    10 2007 034370 A1   1/2009
EP        2 213 957 A2    8/2010
(Continued)

OTHER PUBLICATIONS

International Search Report, dated Apr. 14, 2014, from corresponding PCT application.

*Primary Examiner* — Thor Campbell
(74) *Attorney, Agent, or Firm* — Young & Thompson

(57) ABSTRACT

A boiler (100) for a machine for preparing beverages, intended to heat a liquid pressurized to at least 8 bars, so that the heated liquid can brew a product, with the boiler including:
- a body (1) having an outer wall (2) covered with a screen-printed resistance (14) and an inner wall (3);
- the inner wall (3) of the body (1) having a longitudinal wall (4) which has a circular cross-section, as well as a bottom wall (5);
- an inner element (30) having an outer face (35) for defining, together with the longitudinal wall (4), at least a portion of heating chamber (102);
- a liquid inlet (10) and outlet (12);
- a support (20) so configured as to cooperate with the body (1) so as to form, together with the longitudinal wall (4) and the bottom wall (5), a sealed enclosure (101) including the heating chamber (102).

24 Claims, 3 Drawing Sheets

(51) Int. Cl.
*A47J 31/54* (2006.01)
*B23P 15/00* (2006.01)

(56) References Cited

U.S. PATENT DOCUMENTS

| | | | | |
|---|---|---|---|---|
| 1,688,796 | A * | 10/1928 | Baker | F24H 1/102 |
| | | | | 392/398 |
| 2,228,004 | A * | 1/1941 | Ewing | F24H 1/142 |
| | | | | 392/462 |
| 2,775,683 | A * | 12/1956 | Kleist | F25B 43/00 |
| | | | | 222/146.3 |
| 2,835,782 | A | 5/1958 | Stiebel | |
| 4,286,140 | A * | 8/1981 | Dewulf | F24H 1/142 |
| | | | | 165/156 |
| 4,480,172 | A * | 10/1984 | Ciciliot | F22B 1/288 |
| | | | | 165/140 |
| 4,563,571 | A * | 1/1986 | Koga | F24H 1/102 |
| | | | | 219/543 |
| 5,441,710 | A * | 8/1995 | Marois | B01D 45/16 |
| | | | | 392/485 |
| 5,557,704 | A * | 9/1996 | Dennis | D06F 39/04 |
| | | | | 148/606 |
| 6,393,212 | B1 * | 5/2002 | Hutchinson | F04B 19/027 |
| | | | | 392/471 |
| 6,459,854 | B1 * | 10/2002 | Yoakim | A47J 31/545 |
| | | | | 222/71 |
| 7,286,752 | B2 * | 10/2007 | Gourand | A47J 31/542 |
| | | | | 392/465 |
| 8,180,207 | B2 * | 5/2012 | Shirai | E03D 9/08 |
| | | | | 392/465 |
| 8,731,386 | B2 * | 5/2014 | Waechter | F24H 1/009 |
| | | | | 392/479 |
| 9,435,562 | B2 * | 9/2016 | Giffels | F24H 1/103 |
| 9,516,971 | B2 * | 12/2016 | Klein | A47J 31/542 |
| 2011/0041705 | A1 | 2/2011 | Reichl et al. | |
| 2011/0174160 | A1 | 7/2011 | Blanc et al. | |
| 2012/0037009 | A1 | 2/2012 | Blanc et al. | |

FOREIGN PATENT DOCUMENTS

| | | |
|---|---|---|
| FR | 2 855 359 A1 | 11/2004 |
| FR | 2 932 972 A1 | 1/2010 |
| WO | 2009/043851 A2 | 4/2009 |
| WO | 2010121998 A1 | 10/2010 |

* cited by examiner

BOILER FOR A MACHINE FOR PREPARING BEVERAGES

BACKGROUND OF THE INVENTION

Field of the Invention

The present invention relates to a boiler for a machine for preparing hot beverages capable of heating a fluid pressurized to a relatively high pressure. It will find its application especially to coffee machines boilers.

Boilers for hot beverages preparation machines knowingly comprise a block of metal defining a heating chamber within which a resistive element is embedded. Such boilers have the drawback of having a high thermal inertia and require a relatively long time to heat the liquid. In addition, obtaining these boilers induces a high material cost.

In order to get a hot drink within a short time, boilers able to quickly raise the temperature of a liquid for preparing a drink have been provided. These boilers typically comprise heating elements of the screen-printed resistance type associated with one or more diffuser(s).

Such boilers however are rarely used in the preparation of beverages requiring a substantial pressurization of the liquid. As a matter of fact, most of these boilers cannot withstand relatively high pressures above about 8 bars while still having limited overall dimensions and costs. Now, the preparation of some beverages such as espresso coffee requires bringing the liquid to a pressure of about 16 bars for the extraction of coffee. Such solutions are thus used in machines for preparing brewed coffee under low or even no pressure. Making espresso coffee is not possible with these machines.

Description of the Related Art

Other solutions have been developed to enable a very rapid heating of the liquid while resisting pressures sufficient to prepare an espresso coffee. This solution is for example described in the document published under no FR 2932972. This solution consists in providing, in the boiler, thrust-reactive means so arranged as to cooperate with a body and with boiler support means in order to absorb the forces generated by the pressurization of the fluid and tending to move the body away from the support means.

Another significant improvement is described in the document published with reference WO 2010/121998. This improvement consists in providing, in a boiler, a deformation chamber so configured that, when subjected to the pressure in the heating chamber, the diffuser elastically deforms in the deformation chamber so as at least partially to absorb the pressure force.

Another solution is disclosed in document WO2009/043851.

Although efficient, these solutions have a drawback in that their production cost is relatively high. This cost partly results from the manufacturing and the assembling of the various parts of the boiler to withstand the high pressure.

BRIEF SUMMARY OF THE INVENTION

Thus, there is a need for a boiler for hot beverages preparation machines which makes it possible to quickly heat a highly pressurized liquid and has limited complexity and/or production costs.

The invention aims at satisfying such need.

For this purpose, the invention provides a boiler for a machine for preparing beverages, intended to heat a pressurized liquid so as to brew a product comprising:
- a body having an outer wall covered with a screen-printed resistance and an inner wall forming at least a part of a heating chamber;
- the inner wall of the body having a longitudinal wall extending in a longitudinal direction and having a circular cross-section according to a plane perpendicular to the longitudinal direction,
- an inner element having an outer face located opposite the longitudinal wall of the body for defining, together with the longitudinal wall, at least a portion of a heating chamber;
- a liquid inlet and outlet in the heating chamber, and wherein:
  - the inner wall of the body also has at least a bottom wall located at a distal end of the longitudinal wall,
  - a support so configured as to cooperate with the body so as to form, together with the longitudinal all and the bottom wall, a sealed enclosure.

The invention thus provides a boiler for a machine for preparing beverages adapted to withstand high pressures while being simple, reliable and robust.

In particular, the pressure in the heating chamber is partially applied to the longitudinal wall the section of which is circular, which makes it possible to avoid pressure concentrations. In addition, this pressure is applied to the bottom wall which forms, together with the longitudinal wall, a single piece, preferably monolithic. The enclosure inside which the liquid is pressurized is thus defined by two parts only: the support and the body. The sealing constraints resulting from the pressure are thus reduced.

Besides, and particularly advantageously, the enclosure has only one sealing interface. This unique sealing interface is the interface between the longitudinal wall and the support.

The means required for the sealing and the resistance to pressure are thus essentially concentrated on this interface. The boiler structure is thus significantly simplified. The number of parts it is made of and, consequently the risk of failure and cost thereof are significantly reduced.

Prior to making a detailed review of embodiments of the invention, optional characteristics which may be used in combination or alternately are set forth hereunder:
  The body is advantageously used as a diffuser.
  The body advantageously forms a continuous surface except for the opening intended to be closed by the support and optionally with the exception of an inlet and/or outlet. The body thus has no through opening.
  Said portion of the longitudinal wall of the body is advantageously cylindrical. Alternately, it is tapered with a circular cross-section.
  According to one embodiment, the longitudinal wall has a proximal end opposite the distal end and forming an opening.
  Preferably, the support has an inner face and the cooperation of the inner surface with the body closes the opening.
  The inner face of the support is preferably concave. Alternately, it may be flat.
  Advantageously, the bottom wall is made of the same material as the longitudinal wall. Preferably, the internal wall of the body, formed by the bottom wall and the longitudinal wall is monolithic. The bottom wall has no opening, more particularly no opening for letting the liquid in or out. This makes it possible to define a body having a high resistance to the pressure inside the chamber while enabling a reduction in the thickness of the walls of the body.

Advantageously, the inner wall is made of a thermally conductive material. The inner wall is preferably made of a conductive metal such as aluminium or steel.

Preferably, the body is monolithic and is made of metal.

Preferably, the bottom wall is concave. It is thus curved and preferably not flat.

Advantageously, no edge exists between the bottom wall and the cylindrical portion.

Preferably, the inner element mainly extends in the longitudinal direction.

Advantageously, the inner element is cylindrical.

Advantageously, the inner element is internally hollow so as to form a circulation channel. The boiler is so configured as to allow the liquid to flow through the circulation channel formed by the inner element. The inner element preferably has an opening leading into the heating chamber. The inner element preferably forms a cylindrical tube. It makes it possible to better control the liquid flow inside the boiler and thus to better control the rise in the temperature thereof while still having reduced dimensions.

The support preferably comprises a duct connecting the circulation channel to a port intended to be connected to a member of the machine or to a pipe. This makes it possible to simplify the production and the assembling of the machine. The duct opens into the circulation channel inside the hollow element or to a mouth of the latter. This makes it possible to better control the flow of the liquid and the rise in temperature of the latter.

According to one embodiment, the body has an inlet connecting the heating chamber to a port intended to be connected to a member of the machine or to a pipe. This also makes it possible to simplify the production and the assembling of the machine.

According to one embodiment, the longitudinal wall and the bottom wall form a single part.

Advantageously, the support comprises at least an inlet or an outlet opening into the enclosure. This enables the enclosure to have only an opening at the contact thereof with the support and thus makes it possible to obtain an enclosure very resistant to high pressures.

Advantageously, the support comprises at least: a port intended to be connected to a member of the machine or to a pipe, and a duct fluidly connecting the communication port with the inside of the enclosure.

Advantageously, the support comprises at least an inlet and an outlet opening into the enclosure.

The support advantageously comprises at least: an inlet, an inlet port and a duct connecting the inlet port to the inlet; an outlet, an outlet port and a duct connecting the outlet port to the outlet. Advantageously, one of the inlet or the outlet opens into the heating chamber and the other one of the inlet or the outlet opens into the circulation channel. Thus, the connection of the boiler to the fluid circuit of the machine requires only connecting the support. Before or after these connections, the support is sealingly secured to the body to complete the formation of the sealed enclosure.

Preferably, the boiler comprises a guide so configured as to define, together with an outer face of the inner element and the longitudinal wall, a passageway for the liquid in the heating chamber.

Preferably, the guide has a helical shape and the passageway defines a helicoid.

According to a preferred embodiment, the guide forms a part distinct from the support and the body.

According to another embodiment, the invention relates to a boiler for a machine for preparing hot beverages comprising a boiler adapted to heat a pressurized liquid so that the heated liquid can brew a product comprising:
  a body having an outer wall covered with a screen-printed resistance and an inner wall forming at least a part of a heating chamber;
    the inner wall of the body having a longitudinal wall extending in a longitudinal direction and having a circular cross-section, in a plane perpendicular to the longitudinal direction;
  an inner element having an outer face so configured as to be positioned opposite the inner wall of the body for defining, together with the inner all of the body, at least a portion of a heating chamber;
  a support so configured as to cooperate with the body so as to form a sealed enclosure,
  a liquid inlet and outlet in the heating chamber,
  the boiler being so configured that the displacement of the liquid in the heating chamber in the longitudinal direction is carried out in a first direction;
and wherein:
  the inner element is hollow to form a channel, one end of which opens into the heating chamber and a second end of which communicates with an inlet or outlet duct carried by the support,
  the boiler being so configured that the displacement of the liquid in the channel in the longitudinal direction is carried out in a second direction opposite the first one.

Thus, the inlet and the outlet are positioned at the same end of the enclosure.

The invention also relates to a machine for preparing beverages such as a coffee machine comprising a boiler according to any one of the preceding characteristics. Such machine comprises a pump intended to raise the liquid pressure prior to the introduction thereof into the boiler. Preferably but optionally, the machine also comprises a brewing chamber fluidly connected to the boiler.

In another embodiment, the invention relates to a method for assembling a boiler according to the invention, with such method comprising: inserting the inner element into the body while bringing the support onto the body. Optionally, the insertion of the inner element into the body comprises the screwing of the support relative to the body. Optionally, prior to the insertion of the inner element into the body, a guide is inserted into the body or onto the inner element.

According to another embodiment, the invention relates to a method for assembling a boiler comprising the following steps: inserting a guide into the body or onto the inner element; inserting the inner element into the body.

Other characteristics, objects and advantages of the invention will become apparent upon reading the detailed description that follows and from the appended drawings given as non-limiting examples and wherein:

DETAILED DESCRIPTION OF THE PREFERRED EMBODIMENTS

Figure 1:
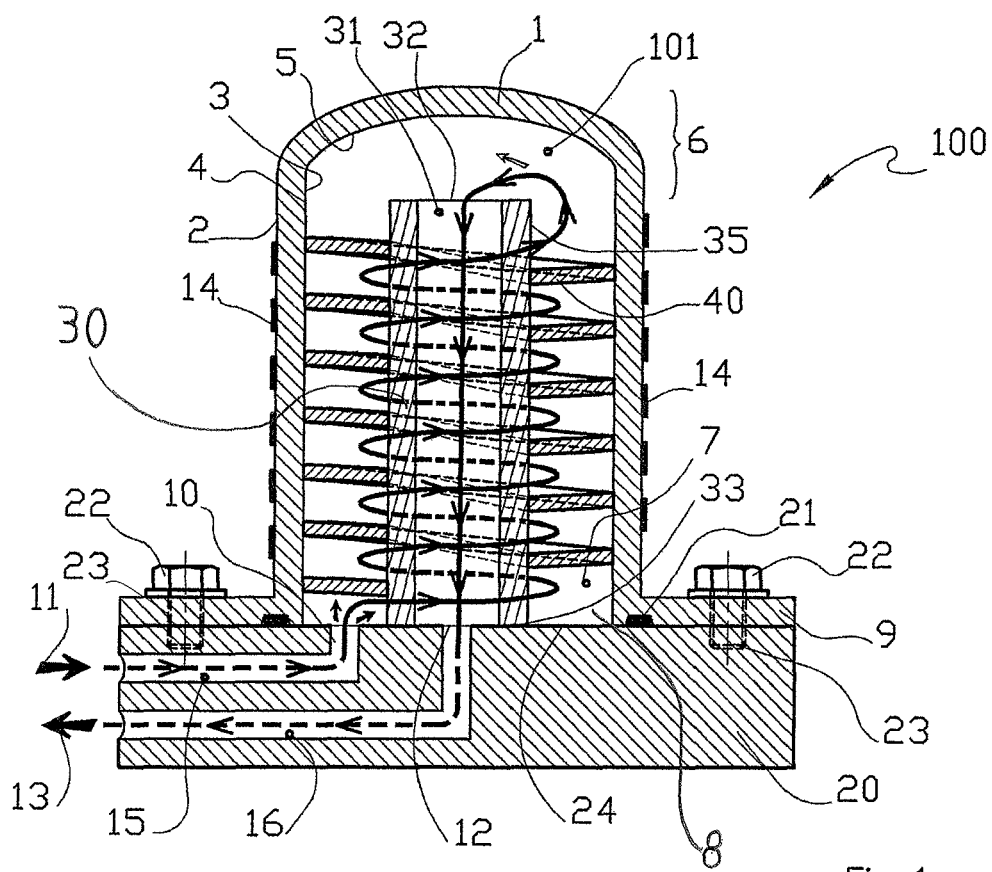
FIG. 1 is a schematic longitudinal section of an exemplary embodiment of the invention.

The drawings are given as examples and are not restricting the invention. They are schematic illustrations in principle intended to facilitate the understanding of the invention and are not necessarily to the scale of practical applications. In particular the relative thicknesses of the various parts and the sections of the various channels are not representative of reality.

One embodiment will now be described in greater details while referring to FIGS. 1 and 4.

The boiler 100 comprises a body 1 and a support 20. The body 1 and the support 20 are so configured as to cooperate in order to form a closed enclosure 101. The body 1 has an outer wall 2 and an inner wall 3 intended to be positioned in contact with the liquid to be heated. The inner wall 3 is associated with one or more heating element(s).

Advantageously, such heating element is a resistive film having a high power density. It is obtained, for example by screen-printing or photo-etching from a resistive ink. It may be of the thick film type, usually referred to as a "Thick Film" or be of the printed circuit type. Such heating element is suitable for the boilers of the FTH (Flow Through Heater) type which have the particularity that their heating element transfers heat almost directly to the fluid when and as the latter moves in a circulation channel. For clarity, reference in the following description will be made to screen-printed resistances only. In each one of the embodiments described hereunder, a photo-etched resistance or any other resistive film having a high power density may be substituted for the screen-printed resistance.

The screen-printed resistance 14 comprises at least one track forming a pattern on the outer wall 2. The screen-printed resistance 14 has a screen-printed track or a plurality of tracks defining the pattern. Such pattern may for example form a coil, a spiral, a set of concentric or juxtaposed circles or any other form.

Preferably, the screen-printed resistance(s) 14 extend(s) over all or at least three quarters of the length of the longitudinal wall.

When the screen-printed resistance is power supplied, it generates heat which is transmitted to the outer wall 2 and, by conduction, to the inner wall 3 and then to the liquid inside the heating chamber 102 and which is in contact with the inner wall 3. Preferably the heating chamber forms a circulation channel and the boiler which is the object of the present invention is a "Flow Through Heater" the definition of which has been given above.

The screen-printed resistance may for example have a thermal capacity ranging from 1,300 watt to 2,500 watt, particularly of the order of 1,800 to 2,200 watts. The wall of body 1 is used as a substrate for receiving the screen-printed resistance and for ensuring a good thermal diffusivity between the screen-printed resistance and the liquid. Advantageously, the internal wall 3 is covered with a food-grade coating.

The inner wall 3 has a portion having a circular section and mainly extending along a longitudinal direction 17. Such inner wall portion 3 is designated as the longitudinal wall 4. The longitudinal wall 4 preferably has a cylindrical shape as shown in FIGS. 1 to 4. Advantageously, the outer wall at the longitudinal wall 4 also has a cylindrical shape. Alternately, the longitudinal wall 3 has a tapered shape with a circular section.

The inner wall 3 is extended to a distal end 6 by an end wall 5. The end wall 5 and the longitudinal wall 4 form a perfect seal. They are preferably formed in a single piece. Even more advantageously, the inner wall formed by the bottom wall and the longitudinal wall 4 is a monolithic piece. The resistance to pressure is thus improved.

The bottom wall 5 and the longitudinal wall 4 preferably define an edge-free surface. The interface between the longitudinal wall 4 and the bottom wall 5 is thus continuous.

The bottom wall 5 is preferably concave. The pressure distribution on this face is therefore made more homogeneous. Stress concentration zones are thus avoided.

The body has an opening 8 at its proximal end 7. The support 2 is so configured as to cooperate with the support 20 and so configured as to cooperate with the body 1 to close such openings 8. For example, this opening 8 is defined by a section of the longitudinal wall 4 of the body and thus forms a plane. The support 20 is then so shaped as to engage the body in order to cover this opening 8. More precisely, this opening 8 is covered by an outer face 24 of the support 2.

Preferably, the body 1 has a flange 9 in alignment with the circular wall section and mainly extending in a plane perpendicular to the longitudinal direction 17.

This flange 9 is so configured as to accommodate means for fixing the body 1 to the support 20. Such fixing means are removable. They are advantageously clip-on or snap-on elements. Alternately, and as shown in the figures, such fixing means comprise screws 22 bearing on one of the body 1 whereon the support 20 is fixed in matching threads 23 provided in the other one of the body 1 or the support 20.

Alternately, one of the body 1 and the support 20 has each a complementary thread. The support is then fixed to the body by screwing the support directly to the body or vice versa. Advantageously, in this solution, no other fastening is required.

Advantageously, at least one seal 21, preferably an O-ring, is provided at the interface between the body and the support. This completes the sealing of the enclosure.

The boiler 100 is so shaped that the fixing means of the body 1 on the support 20 ensure the securing thereof when a pressure, typically between 8 and 25 bars, prevails in the enclosure 101.

As can be seen in the figures, the pressure in the enclosure is thus exerted on the longitudinal wall 4, the bottom wall 5 and on the inner face 24 of the support 20.

The longitudinal wall 4 and the bottom wall 5 form a single part. The enclosure is thus defined by a single interface between two elements: on the one hand the body 1 and on the other hand, the support 20. The invention thus significantly reduces the problems of sealing and resistance to pressure.

In addition, the enclosure 101 is defined by walls that promote a homogeneous distribution of pressure, thereby limiting the stress concentration zones and thus the risk of rupture under the effect of pressure. For this purpose, and as indicated above, the longitudinal wall 4 has a circular section and the bottom wall 5 is preferably convex.

According to the embodiment illustrated in FIG. 1, the inner face 24 of the support 20 is flat. According to a preferred embodiment illustrated in FIG. 3, such inner face 24 of the support 20 is concave. This makes it possible to improve the homogeneity of pressure distribution on the support, thereby eliminating the stress concentration areas. Thus, none of the inner walls 3, 4, 24 of the enclosure is flat. All are concave.

As the resistance to pressure of the boiler is significantly improved, there is no need to use complex effort recovery means. Complexity, the cost of parts and assembling problems are thus reduced. Moreover, as the circular and concave shapes of the inside of the enclosure 101 enable to better withstand the pressure, they enable a reduction in the wall thickness of the body 1. As thickness is reduced, the propagation of heat from the resistance 14 to the liquid is quicker. The preparation of the beverage is thus accelerated. In addition, by reducing the mass and thus the inertia of the body, the invention makes it possible to reduce the energy consumption of the boiler. As a matter of fact, the body then acts as a heat diffuser, which immediately transfers the heat it receives to the liquid. The temperature of the body, at the resistance is then equal or substantially equal to that of the liquid in contact with the longitudinal wall 4. The heat energy which remains stored in the body 1 after the preparation of the beverage is thus significantly reduced.

Advantageously, but optionally, the boiler 100 also comprises a protective cover so configured as to cover the body 1 or at least the portion of the body 1 which carries the silk-screened resistances 14. Such cover provides thermal and also preferably electric protection which prevents a user or a maintenance operator from being burnt and also avoids damage to the other members of the machine close to the boiler. This cover is preferably made of electrically and thermally insulating material. It is for example made of plastic. It preferably covers the entire inner wall i.e. the whole enclosure 101. It may for example be fixed to the body 1 at the flange 9, preferably in an area of the flange remote from the enclosure 101 to prevent heat transfer from the enclosure 101 to the cover. For clarity this cover is not shown in the figures.

The boiler 100 also comprises at least an inlet 10 and an outlet 12 to let the liquid in and out of the enclosure respectively. In a particular embodiment, the boiler 100 also comprises at least an inlet port 11 and at least an outlet port 13 respectively in communication.

In a particular embodiment, the inlet 10 and/or the outlet 12 of the enclosure are not directly accessible from the outside of the boiler 100. This is the case of the example illustrated in FIGS. 1 and 4. In this case, the boiler then has an inlet port 11 in communication with the inlet 10. This communication is preferably provided by an inlet duct 15. Similarly, the boiler 13 has an outlet port in communication with the outlet 12, with such communication being provided through an outlet duct 17.

These inlet and outlet ports 11 and 13 are intended to cooperate with hydraulic members of the machine. The inlet port 11 is typically connected to a pipe connecting the boiler to a pump. Alternately or cumulatively, the outlet port 13 is typically connected to a pipe connecting the boiler to a chamber wherein a product is brewed.

Figure 4:
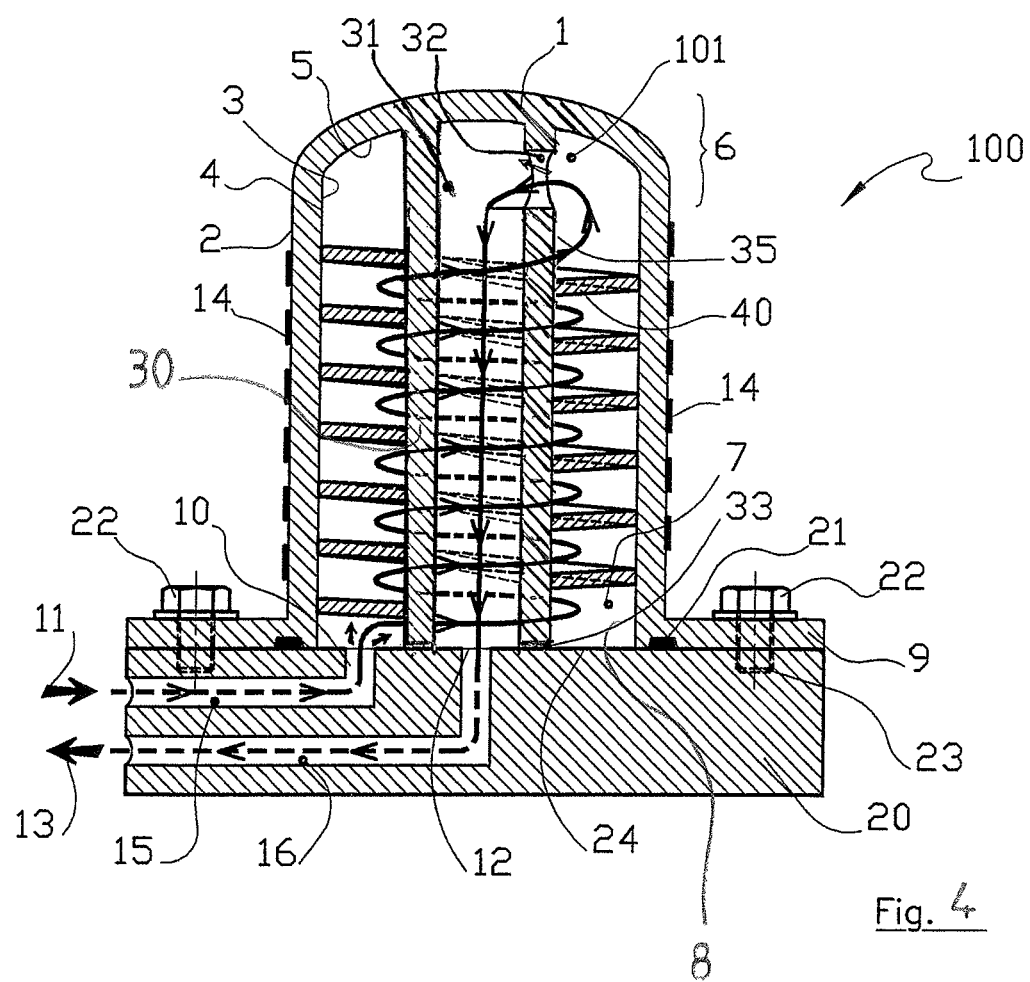
FIG. 4 is a schematic longitudinal section of another embodiment of the invention.

According to an advantageous embodiment, illustrated in FIGS. 1 and 4, the inlet 10 and the outlet 12 are carried by the support 2. The ducts 15 and 16 are also carried by the support 2. The ports 11 and 13 are also carried by the support 2. This particularly advantageous configuration makes it possible to simplify the manufacture of the boiler and to improve the reliability of the seal. In addition, the assembly is also simplified. As a matter of fact, the inlet and outlet ports 11 and 13 just have to be connected to the other members of the boiler, and the body just has to be, previously or subsequently, fixed to the support 20 for the boiler to be able to operate.

Particularly advantageously, the support 20 is made of a thermally insulating material. This makes it possible to reduce the thermal inertia of the boiler. In addition, it is preferably produced by moulding and for example by injection moulding. It is preferably made of plastic.

Figure 3:
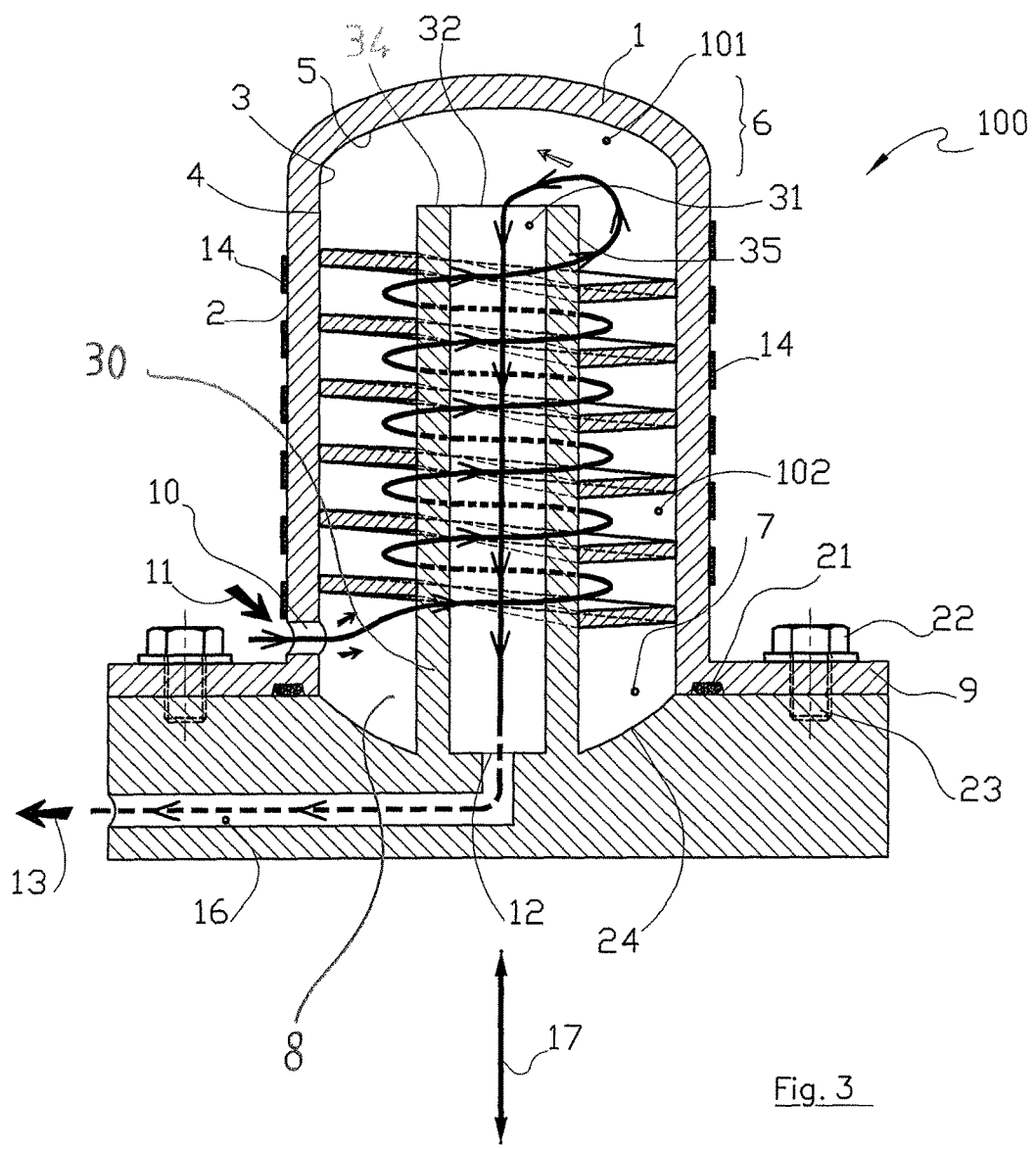
FIG. 3 is a schematic longitudinal section of another embodiment of the invention.

According to alternative embodiments, the inlet 10 and/or the outlet 12 is carried by the body 1. The matching port 11 or 13 can then be also carried by the body 1. In the example of FIG. 3, the inlet 10 of the enclosure and the inlet port 11 are carried by the body 1.

Optionally but particularly advantageously, the boiler also comprises an inner element 30. The inner element 30 has an outer face 25 opposite the inner wall 3 of the body 1. The space defined between the inner wall 3 of the body 1 and the inner element 30 defines the volume of the heating chamber. As a matter of fact, the liquid in this volume absorbs the heat energy transmitted from the resistances 14 to the inner wall 3. The heating chamber 102 is thus contained in the enclosure 101. The inner element 30 mainly extends in the longitudinal direction 17. It has a first end 33 in contact with or close to the support 20 and a second end 34 in contact with or close to the bottom wall 5.

In one optional but advantageous embodiment, the inner element 30 is hollow. It thus comprises a circulation channel 31. For this purpose, it has an orifice 32 at its second end 34 or adjacent to the latter. The orifice 32 enables the liquid present in the heating chamber to flow back into or out of the channel 31, depending on the flow direction. The port 32 is thus in fluid communication with one of the inlet 10 or the outlet 12. As for the first end 33 of the inner element 30, it is in fluid communication with the other one of the inlet 10 or the outlet 12.

Thus, if the inlet 10 opens into the heating chamber, the boiler is then so arranged that the liquid successively goes through: the inlet 10, the heating chamber 102, the orifice 32, the channel 21, the first end 33, the outlet 12. Of course, this flow is in the opposite direction if the inlet and the outlet are reversed. The first end 33 of the channel 31 opens into the inlet 10/the outlet 12 and thus communicates with the inlet 15/outlet 16 duct and the port 11, 13 associated therewith.

Thus, in the heating chamber, i.e. in the inner volume of the enclosure 101, except for the volume occupied by the inner element 30, the liquid moves in a first direction along a projection in the longitudinal direction 17 and moves in the channel 31 in a second direction opposite the first direction along the same longitudinal projection.

The inlet 10 and the outlet 12 are located on the same side with respect to a median plane transverse to the longitudinal direction 17 and passing through the middle of the longitudinal wall 4. The assembling of the boiler 100 is thus facilitated. Moreover, the fluid path is lengthened without the size or the complexity of the boiler being increased however.

Preferably and advantageously, the inner element 30 is made of a good heat conductive material. Thus it can be used as a diffuser to balance the temperature of the liquid inside the circulation channel 31 with the liquid in contact with its outer surface 35, i.e. the liquid in the heating chamber 102.

It is preferably made of metal. In this case, and if the support 20 is made of another material such as plastic, the inner element 30 is previously attached to the support 20. It can be noted that the pressure inside the channel 31 and the heating chamber 102 is identical. No pressure force therefore tends to separate the inner element 30 and the support 20.

According to another embodiment the inner element is made of a material with a low thermal inertia. It is for example made of plastic. And it absorbs little heat accumulated by the liquid.

Figure 2:
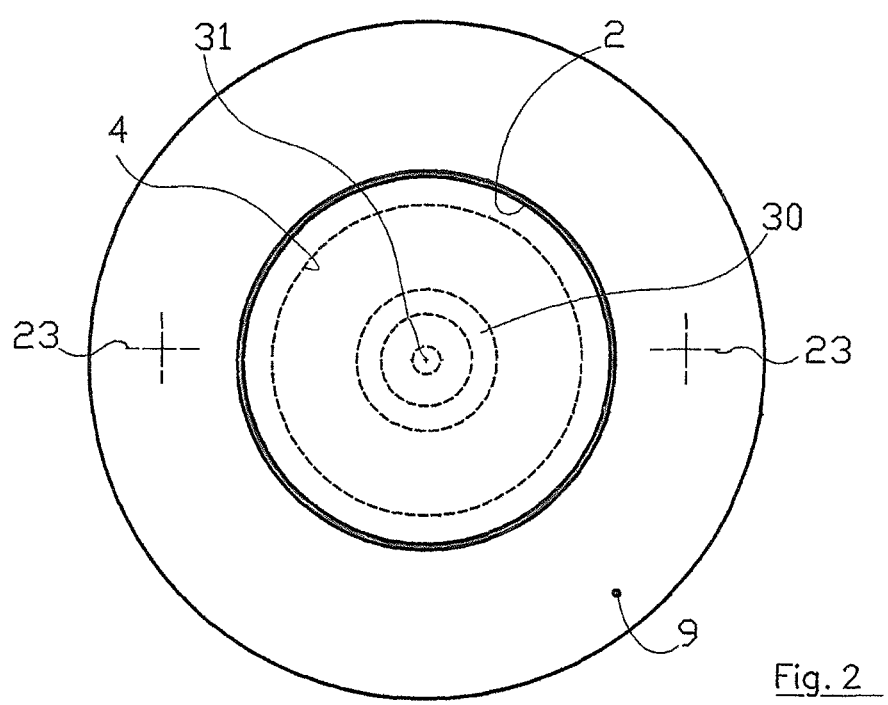
FIG. 2 is a cross-sectional view of the embodiment illustrated in FIG. 1.

According to a first embodiment, illustrated in FIGS. 1 to 3, the inner element is secured to the support 20. Advantageously it forms with the latter a monolithic piece.

According to a second embodiment, the inner element 30 is fixed to the support 20, for example by snap-on or by screwing means. It then forms a tight bond to the substrate 20 at the first end 33.

According to a third embodiment, illustrated in FIG. 4, the inner element 30 is carried by the inner wall 3 of the body 1, for example by the bottom wall 5. The first end 33 then comes close to and preferably in contact with the inner surface 24 of the support 20, for example by means of a seal.

Preferably, the boiler comprises a guide 40 located between the inner wall 3 and the inner element 30. The guide 40 is so shaped as to guide the liquid between the channel 31 and the inlet 10/outlet 12 opening into the heating chamber. Typically, the guide forms a helicoid.

Advantageously, the outer diameter of the guide preferably makes a tight fit with the inner wall 3. According to one embodiment, the internal diameter of the guide 40 enables a sliding fit with the outer face of the inner element 30. The insertion of the inner element 30 into the body 1 provided with the guide 40 is thus facilitated. The adjustments of the guide 40 relative to the body 1 and the inner element 30 are also provided so that the liquid follows a helicoid when it flows into the heating chamber.

Alternately, the internal diameter of the guide enables a tight fit with the outer face of the inner element 30. Thus the liquid only follows a helicoid when it flows into the heating chamber.

According to one embodiment, the guide is made of metal. In another embodiment, the guide is made of a material having a low thermal inertia such as plastic.

According to a preferred embodiment, the guide 40 forms a part distinct from the support and the body. According to another option, the guide 40 forms, with the body 1, a monolithic piece. In this case, it may for example be provided for the guide to be formed by moulding on the inner wall 3 of the body 1.

According to another option, the guide 40 forms, with the support 20, a monolithic piece.

While referring to the boiler 100 in FIG. 1 as a not restrictive example, the liquid follows the following path: in-flowing through the inlet port 12, the inlet duct 15 carried by the support 20, the inlet 10 opening into the heating chamber 102, helical evolution in the heating chamber 102 while being guided by the guide 40, the orifice 32, the circulation channel 31, the outlet 12 of the heating chamber, the outlet pipe 16 carried by the support 20, the outlet port 13.

In the preferred embodiment wherein the inner element 30 is made of metal or any other good heat conductive material, the invention also has the advantage of better distributing the heat between the inlet and outlet points of the liquid into/out of the enclosure.

As a matter of fact, and as shown in FIGS. 1 to 4, as the inlet 10 and the outlet 12 are located on the same side and as the inner element 30 is thermally conductive, the boiler 100 makes it possible to accelerate the heating of the cold liquid flowing into the boiler by its contact with the inner element 30, the wall of which is heated by the hot liquid flowing in the circulation channel 31 toward the outlet 12. The cold liquid is thus heated both by the longitudinal wall 3 and by the outer wall 35 of the inner element 30. The heating time and the beverage preparation time are thus reduced.

According to another embodiment, not illustrated, the inlet 10 and the outlet 12 are reversed with respect to the embodiments illustrated in FIGS. 1 to 4. In this embodiment, the inlet 10 opens into the circulation channel 31 and the outlet 12 opens into the heating chamber 102. In this case, the invention has the advantage of preheating the cold liquid through its contact with the inner wall of the circulation channel 31 which is heated by the hot liquid flowing against the outer wall 35 of the heating element 30. The liquid is thus heated before exiting the circulation channel 31 and reaching the heating chamber 102.

Such fluid flow direction will naturally be reversed if the inlet and outlet are reversed.

From the foregoing description, it is clear that the boiler according to the invention makes it possible to improve the resistance to pressure while allowing easy assembling and while having a high reliability.

The invention is not limited to the embodiments described by way of example and extends to all the embodiments covered by the claims.

REFERENCES 1. body
2. outer wall
3. inner wall
4. longitudinal wall
5. bottom wall
6. distal end
7. proximal end
8. body opening
9. flange
10. inlet
11. inlet port
12. outlet
13. outlet port
14. silk-screened resistance
15. inlet duct
16. outlet duct
17. longitudinal direction
20. support
21. seal
22. screw
23. thread
24. inner face of the support
30. inner element
31. circulation channel
32. orifice
33. first end
34. second end
35. outer face
40. guide
100. boiler
101. enclosure
102. heating chamber

The invention claimed is:
1. A boiler for a machine for preparing beverages, intended to heat a liquid pressurized to at least 8 bars, so that the heated liquid can brew a product, with the boiler comprising:

a body having an outer wall covered with a screen-printed resistance and an inner wall;

the inner wall of the body having a longitudinal wall extending in a longitudinal direction and having a circular cross-section, an inner element having an outer face located opposite the longitudinal wall of the body for defining, together with the longitudinal wall, at least a portion of a heating chamber;

a liquid inlet and outlet in the heating chamber, wherein the inner wall of the body also has at least a bottom wall located at a distal end of the longitudinal wall, a support so configured as to cooperate with the body so as to form, together with the longitudinal wall and the bottom wall, a sealed enclosure comprising the heating chamber, and wherein the bottom wall has no opening for letting the liquid in or out, the inner element is internally hollow so as to form a circulation channel for the liquid, the inner element has an opening so that the circulation channel communicates with the heating chamber, and the support comprises a duct connecting the circulation channel to a port.

2. The boiler according to claim 1, wherein said longitudinal wall of the body is cylindrical.

3. The boiler according to claim 1, wherein the longitudinal wall has a proximal end opposite the distal end and forming an opening.

4. The boiler according to claim 1, wherein the support has an inner face and the cooperation of the inner surface with the body closes such opening.

5. The boiler according to claim 4, wherein the inner face is concave.

6. The boiler according to claim 1, wherein the bottom wall is made of the same material as the longitudinal wall.

7. The boiler according to claim 1, wherein the inner wall of the body is monolithic.

8. The boiler according to claim 1, wherein the inner wall is made of a thermally conductive material.

9. The boiler according to claim 1, wherein the inner wall is made of a conductive metal such as aluminium or steel.

10. The boiler according to claim 1, wherein the bottom wall is concave.

11. The boiler according to claim 1, wherein the inner element mainly extends along the longitudinal direction.

12. The boiler according to claim 1, wherein the inner element is cylindrical.

13. The boiler according to claim 1, wherein the body comprises an inlet connecting the heating chamber to a port intended to be connected to a member of the machine or to a pipe.

14. The boiler according to claim 1, wherein the longitudinal wall and the bottom wall form a single part.

15. The boiler according to claim 1, wherein the support comprises at least an inlet or an outlet opening into the enclosure.

16. The boiler according to claim 15, wherein the support comprises at least:
a port intended to be connected to a member of the machine or to a pipe, and
a duct fluidly connecting the communication port with the inside of the enclosure.

17. The boiler according to claim 15, wherein the support has at least an inlet and an outlet opening into the enclosure.

18. The boiler according to claim 15, wherein the support comprises at least:
an inlet, an inlet port and a duct connecting the inlet port to the inlet;
an outlet, an outlet port and a duct connecting the outlet port to the outlet;
and wherein one of the inlet or the outlet opens into the heating chamber and the other one of the inlet or the outlet opens into the circulation channel.

19. The boiler according to claim 1, comprising a guide so configured as to define, together with an outer face of the inner element and the longitudinal wall, a passageway for the liquid in the heating chamber.

20. The boiler according to claim 19, wherein the guide has a helical shape and the passageway defines a helicoid.

21. A machine for preparing hot beverages comprising a boiler according to claim 1, and a pump so configured as to supply the boiler with a pressurized liquid.

22. A method for assembling a boiler according to claim 1, comprising: inserting the inner element into the body while bringing the support onto the body.

23. The method for assembling a boiler according to claim 22 wherein the insertion of the inner element into the body comprises the screwing of the support relative to the body.

24. The method for assembling a boiler according to claim 22, wherein, prior to the insertion of the inner element into the body, a guide is inserted into the body or onto the inner element.

* * * * *